(12) United States Patent
Troclet et al.

(10) Patent No.: US 11,987,038 B2
(45) Date of Patent: May 21, 2024

(54) ACOUSTIC ATTENUATION PANEL WITH IMPROVED PERFORMANCES IN LOW AND MEDIUM FREQUENCIES

(71) Applicant: ArianeGroup SAS, Paris (FR)

(72) Inventors: Bernard Troclet, Paris (FR); Pierre Godart, Foucrainville (FR)

(73) Assignee: ARIANEGROUP SAS, Paris (FR)

( * ) Notice: Subject to any disclaimer, the term of this patent is extended or adjusted under 35 U.S.C. 154(b) by 520 days.

(21) Appl. No.: 17/271,623

(22) PCT Filed: Aug. 20, 2019

(86) PCT No.: PCT/FR2019/051942
§ 371 (c)(1),
(2) Date: Feb. 26, 2021

(87) PCT Pub. No.: WO2020/043978
PCT Pub. Date: Mar. 5, 2020

(65) Prior Publication Data
US 2021/0268767 A1  Sep. 2, 2021

(30) Foreign Application Priority Data

Aug. 27, 2018  (FR) ...................... 1857684

(51) Int. Cl.
*B32B 3/26*  (2006.01)
*B32B 5/02*  (2006.01)
(Continued)

(52) U.S. Cl.
CPC .............. *B32B 5/245* (2013.01); *B32B 3/266* (2013.01); *B32B 5/024* (2013.01); *B32B 5/18* (2013.01);
(Continued)

(58) Field of Classification Search
CPC ......... B32B 5/245; B32B 3/266; B32B 5/054; B32B 7/12; B32B 2262/148;
(Continued)

(56) References Cited

U.S. PATENT DOCUMENTS 7,320,739 B2 *  1/2008  Thompson, Jr. .......... B32B 5/04
156/196
2002/0170235 A1 *  11/2002  Petroski ................. B60J 5/0416
49/502
(Continued)

FOREIGN PATENT DOCUMENTS

EP  2053593 A2  4/2009
FR  2888386 A1  1/2007
(Continued)

OTHER PUBLICATIONS

Search Report issued in French Patent Application No. 1857684 dated Jul. 9, 2019.
(Continued)

*Primary Examiner* — Forrest M Phillips
(74) *Attorney, Agent, or Firm* — Pearne & Gordon LLP

(57) ABSTRACT

An acoustic attenuation panel including: a main layer made of a porous material and having two opposite faces; a coating layer arranged on one of the two faces of the main layer; an adhesive film, arranged at the interface between the main layer and the coating layer to assemble same. The main layer is a body made of melamine resin foam having a density between 6 and 6.8 kg/m$^3$ and a porosity rate between 0.978 and 0.984; the coating layer is a fabric with a density between 484 and 526 kg/m$^3$ and a porosity rate between 0.771 and 0.817; the adhesive film is a film made of a thermoplastic material provided with holes passing through and having a surface density between 40 g/m$^2$ and 56 g/m$^2$.

11 Claims, 2 Drawing Sheets

(51) Int. Cl.
  *B32B 5/18* (2006.01)
  *B32B 5/24* (2006.01)
  *B32B 7/12* (2006.01)
  *B60R 13/08* (2006.01)
  *B61D 17/00* (2006.01)
  *B64C 1/40* (2006.01)
  *G10K 11/168* (2006.01)

(52) U.S. Cl.
  CPC .............. *B32B 7/12* (2013.01); *G10K 11/168* (2013.01); *B32B 2262/0276* (2013.01); *B32B 2262/062* (2013.01); *B32B 2262/148* (2021.05); *B32B 2266/0285* (2013.01); *B32B 2307/102* (2013.01); *B32B 2307/72* (2013.01); *B32B 2307/7242* (2013.01); *B32B 2419/00* (2013.01); *B32B 2605/08* (2013.01); *B32B 2605/10* (2013.01); *B32B 2605/18* (2013.01); *B60R 13/08* (2013.01); *B61D 17/005* (2013.01); *B64C 1/40* (2013.01)

(58) Field of Classification Search
  CPC ...... B32B 2262/0276; B32B 2262/062; B32B 2266/0285; B32B 2307/102; B32B 2307/72; B32B 2307/7242; B32B 2605/08; B32B 2605/10; B32B 2605/18; G10K 11/168; B60R 13/08; B61D 17/005; B64C 1/40
  See application file for complete search history.

(56) References Cited

U.S. PATENT DOCUMENTS

| | | | | |
|---|---|---|---|---|
| 2008/0067001 | A1* | 3/2008 | Sviridenko | B60R 13/0838 181/286 |
| 2008/0236936 | A1* | 10/2008 | Niwa | B60R 13/0884 181/200 |
| 2010/0032234 | A1* | 2/2010 | Niwa | B60R 13/0838 181/290 |
| 2011/0067949 | A1* | 3/2011 | Mori | B32B 5/28 181/198 |
| 2014/0027200 | A1* | 1/2014 | Mori | G10K 11/168 156/196 |
| 2017/0129204 | A1* | 5/2017 | Mori | B32B 37/10 |
| 2018/0104937 | A1* | 4/2018 | Wu | B32B 5/245 |

FOREIGN PATENT DOCUMENTS

| | | |
|---|---|---|
| FR | 2979281 A1 | 3/2013 |
| WO | 2016124830 A1 | 8/2016 |
| WO | WO-2017159646 A1 * | 9/2017 |

OTHER PUBLICATIONS

International Search Report for Application No. PCT/FR2019/051942 dated Dec. 17, 2019.
Written Opinion for PCT/FR2019/051942 dated Dec. 17, 2019.

* cited by examiner

ACOUSTIC ATTENUATION PANEL WITH IMPROVED PERFORMANCES IN LOW AND MEDIUM FREQUENCIES

This is the National Stage of PCT international application PCT/FR2019/051942, filed on Aug. 20, 2019 entitled "ACOUSTIC ATTENUATION PANEL WITH IMPROVED PERFORMANCE IN LOW AND MEDIUM FREQUENCIES", which claims the priority of French Patent Application No. 1857684 filed Aug. 27, 2018, both of which are incorporated herein by reference in their entirety.

TECHNICAL FIELD

The present invention relates to an acoustic attenuation panel intended to be attached to a wall of a part whereof the sound transmission is to be reduced, in order to increase the reduction of the noise traversed by said part.

Said part may in particular be a space launcher nose cone, a space launcher inter-stage structure, an aircraft fuselage, a building, a motorised vehicle (for example an automobile) or a train.

PRIOR ART

Acoustic attenuation panels are used in many fields to reduce acoustic nuisances.

They generally comprise a main layer of the honeycomb or porous material type, as well as a coating layer covering one of the two opposite faces of the main layer (namely the incident sound wave side face), said two layers being bonded on one another with the aid of an adhesive film. The panel is intended to be attached on the wall of the part whereof the sound transmission is to be reduced, the attachment being done by the other of the two faces of the main layer of the panel.

The aim of the main layer and the coating layer is to contribute to the sound absorption of the panel; they are therefore made of sound absorption materials.

Furthermore, the coating layer is air permeable (it may for example concern a perforated skin). It also aims, in some use cases inducing pressure changes, to make it possible to depressurise the air trapped in the cells or cavities of the main layer such as, for example, to depressurise in flight the air trapped on the ground in the cells or cavities.

In some particular cases, the acoustic attenuation panels must further be designed in order to be installed in hot areas of a structure. Therefore, they must, in addition to reducing the transmission of the noise, withstand the heat.

This is in particular the case of space launchers, which are subjected to a severe acoustic environment upon lift-off, due to the emission of supersonic jets from the solid rocket boosters and to the impact thereof on the launch pad, as well as to the high temperatures during flight phases. The acoustic transparency of the sandwich type parts of the upper portion of launchers leads to high acoustic levels inside the compartment of the payloads of the launcher, in the low frequency range up to the high frequency range (frequencies less than 2,000 Hz).

It should be reminded regarding this subject matter that the acoustic levels specified in the user manual of the ARIANE 5 launcher are respectively of 131 dB and 136 dB at the 63 Hz and 125 Hz frequency octave bands. The induced acoustic levels applied to payloads in said frequency ranges are determining, in particular for the equipment of the satellite, in particular the antenna reflectors since the reflectors are light and have the first vibration modes thereof in said frequency bands.

The solution retained for the ARIANE 5 launcher in terms of attenuation of the noise is an acoustic panel whereof the sound absorption coefficient depending on the frequency is illustrated in FIG. 2. Said panel comprises, as main layer, a body made of melamine resin foam of 10 cm of thickness having a surface density of 1,026 g/cm$^2$, a fabric as coating layer, and an adhesive film for the assembly of the coating layer on the main layer. As can be noted, the sound absorption coefficient of said panel is less than 0.2 at the 63 Hz frequency octave band and is less than 0.5 at 125 Hz. Thus, the sound absorption coefficient is too low in the low and medium frequency ranges, in particular at the 63 Hz and 125 Hz octave bands.

The inventors have sought to improve the acoustic attenuation performances in order to design a panel that has more efficient sound absorption capacities in the low and medium frequency ranges, without the acoustic performances thereof being degraded at higher frequencies, and while decreasing the weight of the panel.

DESCRIPTION OF THE INVENTION

In order to meet this need, firstly one object of the invention is an acoustic attenuation panel comprising:
- a first layer, so-called main layer, made of a porous material and having two opposite faces;
- a second layer, so-called coating layer, disposed on one of the two faces of the main layer;
- the panel being characterised in that the main layer is a body made of melamine resin foam having a density between 6 and 6.8 kg/m$^3$ and a porosity rate between 0.978 and 0.984;
- the coating layer is a fabric having a density between 484 and 526 kg/m$^3$ and a porosity rate between 0.771 and 0.817;
- the main layer and the coating layer being assembled one with the other by an adhesive film (4) that is disposed at the interface between the main layer and the coating layer, the adhesive film being a film made of a thermoplastic material provided with through holes and having a surface density between 40 g/m$^2$ and 56 g/m$^2$.

Preferably, the main layer made of melamine resin foam and the coating layer are assembled on one another by lamination by using an adhesive film. In other terms, the adhesive film is positioned between the main layer and the coating layer, then the stacking thus obtained is subsequently thermally treated in order to cause the resin of the adhesive film to polymerise and to increase the resistivity of the assembly.

In the present disclosure of the invention, the expression "between . . . and . . . " must be understood as including the terminals.

Preferably, the main layer has a thickness between 9.5 cm and 11 cm, preferably equal to 10.16 cm.

Preferably, the coating layer has a resistivity between 2,021,988 and 2,471,130 N·s/m$^4$ and an airflow resistance (AFR) between 707 and 865 N·s/m$^3$.

Preferably, the coating layer has a thickness less than 1 mm.

According to one embodiment of the invention, the coating layer is a fabric produced from a mixed yarn consisting of polyester fibres and of cotton fibres, the mixture ratio of polyester fibres and of cotton fibres being preferably of 50/50.

The melamine is a compound of chemical formula 1,3,5-triazine-2,4,6-triamine $C_3H_6N_6$. It is in particular used for synthesising polymers in foam form; the result of said synthesis is then qualified as melamine resin foam.

Many melamine resin foams exist, according to the polymer or polymers that are used with the melamine.

Melamine resin foams have an alveolar structure with open cells and are therefore effective for absorbing acoustic waves. The choice of the melamine resin foam is made depending on the destination of the panel (hot area of a structure or not), on the mass thereof and the acoustic attenuation capacities thereof.

Preferably, the melamine resin foam forming the main layer is a formaldehyde, melamine and sodium bisulphite copolymer. Preferably, the melamine resin foam has a resistivity between 9,752 and 11,196 $N·s/m^4$ and an airflow resistance (AFR) between 990.7 and 1,137.3 $N·s/m^3$.

The coating layer is intended to be disposed on the incident sound wave side. It is intended to be in contact with the aerodynamic flow or with the gaseous medium wherein the sound waves to be absorbed move. By way of example, it is intended to be in contact with the inner cavity of the nose cone of a launcher, in order to reduce the acoustic environment by absorption. The coating layer is a fabric and is therefore air permeable. Fabric means a woven material that includes weft yarns and warp yarns that interweave.

In the present invention, the adhesive film also contributes, as well as the main layer and the coating layer, to the sound absorption of the panel.

The adhesive film includes through holes, which in particular make it possible to depressurise the panel, useful when the panel is for example installed on a space launcher nose cone type structure, on an inter-stage structure or also on an aircraft cabin. Preferably, the adhesive film has a web shape. A possible web shape is shown in FIG. 4. In this web shape, the film includes through holes 6 of different diameters and randomly dispersed. In FIG. 4, the dark portions represent the through holes 6.

Preferably, the adhesive film has a thickness between 0.16 and 0.20 mm.

According to one embodiment of the invention, the adhesive film has, apart from a thickness between 0.16 and 0.20 mm, a melting temperature between 180 and 190° C. Preferably, the adhesive film further has a differential scanning calorimetry between 175° C. and 185° C. and a melt volume-flow rate less than 2 $cm^3/10$ min.

The melting temperature of the adhesive film is measured by Kofler hot bench melting point; the differential scanning calorimetry (DSC) is measured according to the standard ISO 11357; the melt volume-flow rate (MVR) is measured according to the standard ISO 1133-1.

According to a preferred variant of the invention, the elements of the panel have the following features:
- the main layer (2) is a body made of melamine resin foam having a surface density between 600 $g/m^2$ and 680 $g/m^2$ preferably equal to 650 $g/m^2$, and a thickness between 9.5 cm and 11 cm;
- the coating layer (3) is a fabric having a surface density between 110 and 130 $g/cm^2$, preferably equal to 120.75 $g/cm^2$, and a thickness between 0.3 and 0.4 mm, preferably equal to 0.35 mm;
- the adhesive film (4) has a surface density between 40 $g/m^2$ and 56 $g/m^2$, preferably equal to 52 $g/m^2$.

The acoustic attenuation panel according to the invention may be used in many fields where the reduction of acoustic nuisances is sought, such as for example, in the space and aeronautical fields (space launchers, aircraft, helicopters, etc.), but also in the automobile, naval, railway (high-speed trains) industry, in buildings.

Thus, the invention also relates to a part having a wall whereon is attached a panel such as defined according to the invention, said part being chosen from a space launcher nose cone, a space launcher inter-stage structure, a fuselage of an aircraft, a building, a motorised vehicle (for example an automobile) and a train.

Within the scope of the invention, the thicknesses indicated are measured by the Vernier calliper technique for the foam and with the aid of a micrometer for the fabric. The thickness of the adhesive is not measured directly: it is determined from the measurement of the panel once obtained and by subtracting that of the fabric and of the foam.

The resistivities are measured by the static airflow resistivity technique, for example by using a device for measuring the resistivity (SIGMA Airflow Resistance Meter) of the brand Mecanum (Canada-Quebec). This technique is described in the standards ASTM C522-03 and ISO-9053-91.

The porosity and the density are measured according to the missing mass method, published in the *Journal of Applied Physics* 101 (12), 2007. It is possible for example to use a porosity/density meter of the brand Mecanum (Canada-Quebec).

The tortuosity is measured according to a transmission measurement method following the Biot theory, with the aid for example of a tortuosity meter of the brand Mecanum (Canada-Quebec).

The sound absorption measurements follow the standards E1050 and ISO 10534-2; they may be carried out with the aid of an impedance tube (diameter 100 mm), for example of the brand Mecanum (Canada-Quebec).

BRIEF DESCRIPTION OF THE DRAWINGS

Other advantages and features of the invention will become clear upon reading the following detailed description of preferred embodiments of it, given by way of non-limiting example, and made with reference to the appended drawings wherein.

Figure 1:
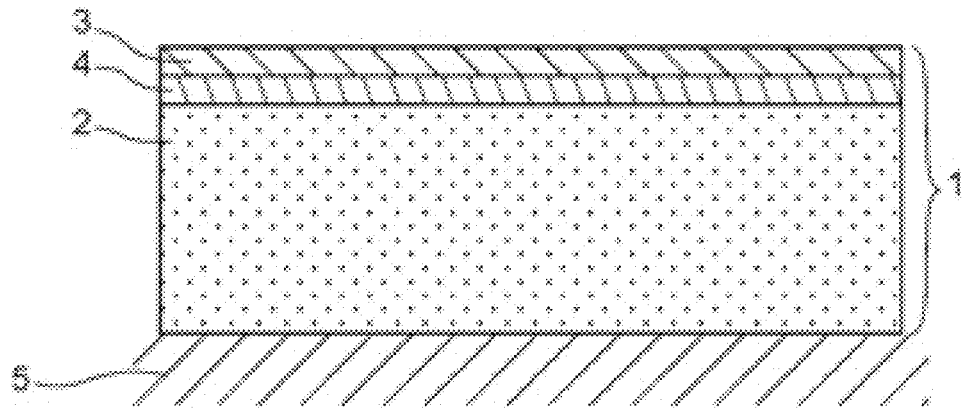
FIG. 1 shows an acoustic attenuation panel according to the invention, according to a sectional view, disposed against a wall.

It is specified that the various elements in FIG. 1 are not shown to scale.

DETAILED DESCRIPTION OF SPECIFIC EMBODIMENTS

In FIG. 1 an acoustic attenuation panel 1 is shown according to the invention. It includes a main layer 2 made of a porous material, a coating layer 3 and an adhesive film 4.

The panel 1 is shown positioned against a wall 5 of a structure. It may for example concern the inner wall of a space launcher nose cone.

The panel may be integrated into the wall during the design of the structure or be added subsequently.

Figure 2:
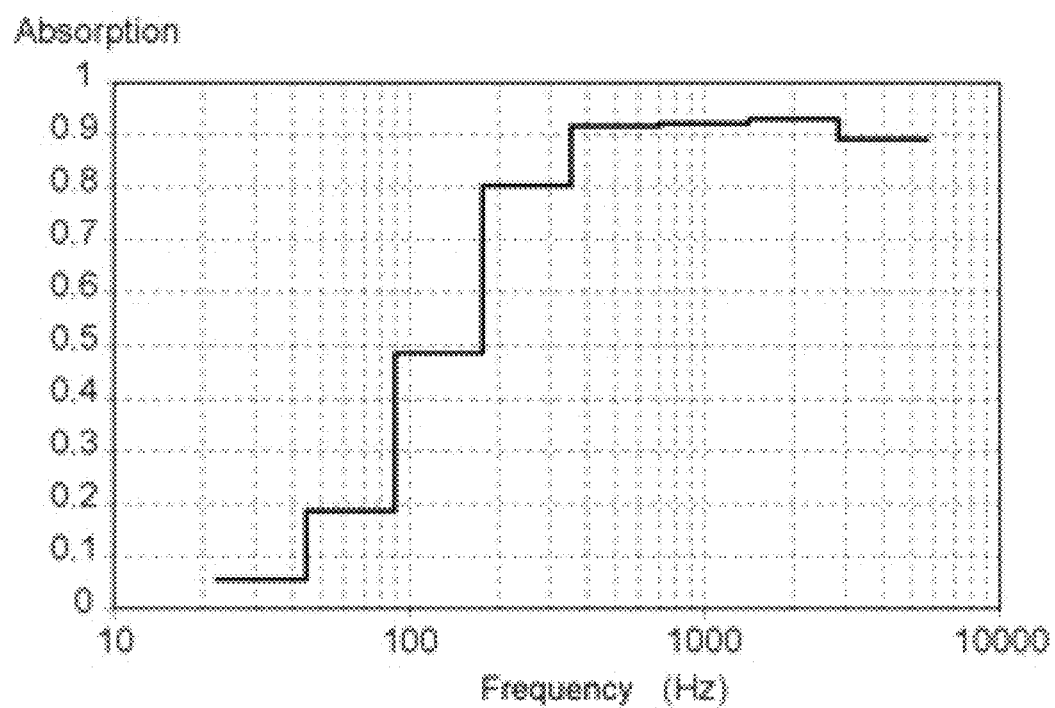
FIG. 2 shows the sound absorption coefficient depending on the frequencies, of the sound absorption panel according to the prior art used in ARIANE 5.

The inventors have sought to optimise the features of the panel of the prior art, used in the payload cavity of the ARIANE 5 space launcher, having an absorption profile such as illustrated in FIG. 2. More specifically, the inventors have sought to design a panel having a sound absorption coefficient of at least 0.3 at 63 Hz and of at least 0.55 at 125 Hz. Obtaining a coefficient of 0.3 at 63 Hz would indeed make it possible to reduce the pressure in the octave band centre frequency of 63 Hz inside the payload cavity by a factor of 1.25 (i.e. a reduction of 2 dB in relation to the reference solution of the Ariane 5 launcher).

For this purpose, the inventors have in particular used, as porous material for the main sound absorption layer, a melamine resin foam having the features indicated in Table 1 below.

TABLE 1 features of the melamine resin foam and of the laminated fabric used in a preferred embodiment of the invention

| Parameters | ULb melamine resin foam | | Fabric 11689C with lamination effect | |
| --- | --- | --- | --- | --- |
| | Value | Standard Deviation | Value | Standard Deviation |
| Porosity rate | 0.981 | 0.003 | 0.794 | 0.023 |
| Resistivity (N · s · m$^{-4}$) | 10,474 | 722 | 2,246,559 | 224,571 |
| AFR (N · s · m$^{-3}$) | 1,064 | 73.3 | 786 | 79 |
| Tortuosity | 1 | 0 | 1 | 0 |
| Viscous characteristic length (μm) | 99.1 | 12.3 | 1 | 0 |
| Thermal characteristic length (μm) | 149.7 | 10.9 | 70 | 0.2 |
| Density (kg/m$^3$) | 6.4 | 0.4 | 505 | 21 |
| Young's modulus (Pa) | 117.4 | 11.7 | — | — |
| Poisson's ratio | 0.41 | 0.07 | — | — |
| Sound insulation | 0.053 | 0.008 | — | — |

The choice amongst the existing melamine resin foams is made depending on the temperature constraints to which the panel must resist, as well as to the mass constraints and, obviously to the acoustic attenuations to be achieved.

The same applies for the fabric and the adhesive film, the choice being made depending on the temperature, mass and acoustic attenuation constraints. Regarding this subject matter, it is specified that the features of the "fabric 11689C with lamination effect" indicated in Table 1 above correspond to the features of said fabric after it has undergone a lamination step with an adhesive film.

By way of example, for a use of the panel in a space launcher nose cone, the various elements of the panel must pass the space environmental qualification tests, namely the ESA (European cooperation for Space Standardization) specifications.

Table 2 below groups a few ESA references and the subject matter to which each reference relates.

TABLE 2 a few ESA references

| Reference | Subject matter |
| --- | --- |
| ECSS-E-ST-10C | System engineering general requirements |
| ESSS-Q-ST-70-71C | Materials, processes and their selection |
| ECSS-E-HB-31-01 Part 5A | Thermal design handbook |
| ECSS-E-HB-32-20 Part 1A | Structural materials handbook |
| ECSS-E-HB-32-21A | Adhesive design handbook |

TABLE 2-continued a few ESA references

| Reference | Subject matter |
| --- | --- |
| ECSS-E-ST-10-06C | Technical requirements specification |
| ECSS-E-ST-32C | Structural general requirements |
| ECSS-E-ST-08C | Materials |

The melamine resin foam manufactured by BASF under the name Basotect™ is suitable for use in a space launcher nose cone, an aircraft cabin, a train or a building, because it has an M1 fire-resistance rating (non-flammable product). Said particular melamine resin foam is a formaldehyde, melamine and sodium bisulphite copolymer.

The panel according to the preferred embodiment of the invention includes a Basotect™ melamine layer bearing the reference "UltraLight b" (or ULb), having a thickness of 4 inches (i.e. 10.16 cm) and the features indicated in Table 1 above.

The so-called "UltraLight b" melamine is a foam derived from the melamine currently used in the space industry, but it is 30% lighter than the conventional Basotect™.

According to a preferred embodiment, and in order to limit the weight of the panel, the inventors have chosen to use, as coating layer, the fabric having features indicated in Table 1 and a thickness less than 1 mm.

The inventors have chosen a woven textile (or fabric) for the coating layer, because the unwoven textiles, mostly, have the fibres thereof that are interlinked by a thermoplastic resin that does not withstand a temperature of 160° C.

Namely, the woven textile used in the preferred embodiment is that manufactured by Victor Textile, located in Canada, under the reference 11689C. It includes the features indicated in Table 1 and a thickness of 0.35 mm, and it is produced from a textured filament yarn of a mixture of polyester/cotton (50/50) fibres.

The woven textile of reference 11689C from Victor Textile has a sound absorption coefficient of at least 0.3 at 63 Hz and of at least 0.55 at 125 Hz. Furthermore, it is light (average surface density of 120.75 g/cm$^2$) and it has a substantially smooth surface (more specifically, it has little surface relief and there are no free fibres on the surface), which has the advantage of ensuring a better adhesion with the foam. Furthermore, as there are no free fibres on the surface of the coating layer, this prevents, in the particular case of space launcher nose cones, the emission of particles during the forced ventilation under the nose cone of the launcher and during the phase of separating/moving away of the launcher from the half-nose cones.

In order to ensure a good holding of the coating layer (fabric) on the main layer (foam) and to increase the airflow resistance of the acoustic attenuation panel, said two elements are bonded on one another by a lamination method by placing an adhesive film made of thermoplastic material at the interface thereof.

Figure 4:
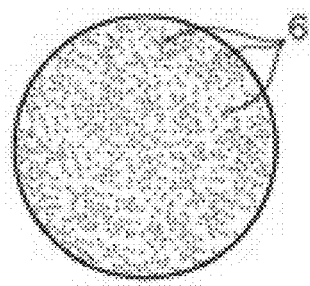
FIG. 4 is a schematic representation, according to a top view, of a web-shaped adhesive film.

The adhesive film will therefore make it possible to bond said two elements, but it also contributes to the acoustic attenuation. It is chosen so that it includes through holes both to enable the air to escape and to contribute to the sound absorption performance of the panel. Preferably, the adhesive film has a web shape, whereof an example is illustrated in FIG. 4. Namely, we have used a hot-melt adhesive from Protechnic.

Protechnic proposes hot-melt adhesive films bearing the name Thermoplast™ and available in the form of solid films or having cutouts according to various patterns (in the shape of strips, hexagons, etc.) forming for example nets or webs.

In the preferred embodiment, we have used a thermoplastic film bearing the reference BB8, which has a web pattern (filaments superimposed giving the impression of a web with cutouts in the form of irregularly placed holes of various diameters) and that meets the requirements of the ESA space thermo-mechanical environment qualification tests (whereof the references are indicated in Table 2 above), by being able to withstand a temperature of 185° C.

Tests have been performed by varying the density of the thermoplastic film.

Figure 3:
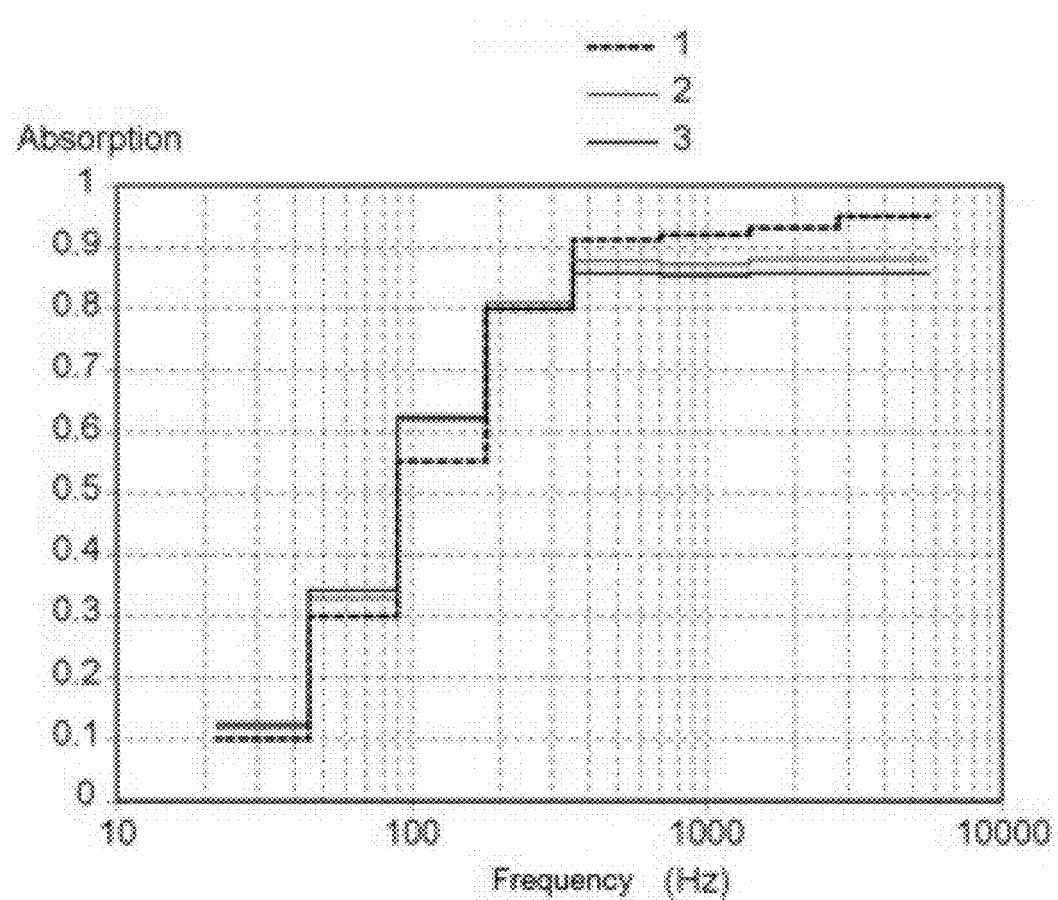
FIG. 3 shows the sound absorption coefficient depending on the frequency of the sound absorption panel produced according to a preferred embodiment of the invention.

A first panel has been produced using a film having a surface density of 40 g/m² and a second panel has been produced by using a film having a surface density of 56 g/m². The sound absorption results obtained for a panel produced with the films of 40 g/m² (curve 2) and 56 g/m2 (curve 3) are shown in FIG. 3 (the curve 1 showing the acoustic attenuation objective to be reached; it is noted that the acoustic attenuation is greater than that of the panel of the prior art used in the Ariane 5 launcher and presented in FIG. 2). The optimum absorption is obtained by interpolation with a surface density of 52 g/m².

By comparing the acoustic performances of the panel of the prior art used in ARIANE 5 and those of the panel produced according to the preferred embodiment of the invention, it is noted that the sound absorption is improved in the low frequency bands with an acceptable loss at high frequencies. More particularly, it is noted that the panel according to the invention satisfies the targeted sound absorption conditions of 0.3 and 0.55 respectively at 63 Hz and 125 Hz, since it provides a sound absorption of 0.35 at 63 Hz and of 0.62 at 125 Hz. Said sound absorptions are greater than those provided by the reference panel of the prior art (see the curve in FIG. 2), and are in particular substantially greater than a factor 2 in the frequency band of the central frequency 63 Hz, which is a critical frequency band for the space launchers. Said factor 2 leads to a reduction of the noise inside the fairing of a launcher of 3 dB.

The panel thus produced satisfies the difficult requirements in terms of sound absorption in the low and medium frequency bands, without the acoustic performances thereof being degraded at higher frequencies.

Furthermore, the panel according to the invention, for the same thickness of sound absorption material made of melamine resin foam, is 30% lighter compared to that of the prior art. Having decreased the weight of the panel has the advantage of improving the payload mass carrying performances of the launcher whereon it is intended to be applied.

We have just described a panel adapted to a use in a space launcher nose cone. But it is clearly understood that the panel according to the invention may be adapted to a use in all kinds of structures, such as for example in an aircraft fuselage, in a carriage of a high-speed train, in a building, etc.

What is claimed is:

1. Acoustic attenuation panel comprising:
    a first layer, so-called main layer, made of a porous material and having two opposite faces; and
    a second layer, so-called coating layer, disposed on one of the two faces of the main layer;
    wherein the main layer is a body made of melamine resin foam having a density between 6 and 6.8 kg/m³ and a porosity rate between 0.978 and 0.984,
    wherein the coating layer is a fabric having a density between 484 and 526 kg/m³ and a porosity rate between 0.771 and 0.817, and
    wherein the main layer and the coating layer are assembled one with the other by an adhesive film that is disposed at the interface between the main layer and the coating layer, the adhesive film being a film made of a thermoplastic material provided with through holes and having a surface density between 40 g/m² and 56 g/m².

2. Panel according to claim 1, wherein the main layer has a thickness between 9.5 cm and 11 cm.

3. Panel according to claim 1, wherein the coating layer has a resistivity between 2,021,988 and 2,471,130 N·s/m⁴ and an airflow resistance (AFR) between 707 and 865 N·s/m³.

4. Panel according to claim 3, wherein the coating layer has a thickness less than 1 mm.

5. Panel according to claim 1, wherein the coating layer is a fabric produced from a mixed yarn consisting of polyester fibres and of cotton fibres, the mixture ratio of polyester fibres and of cotton fibres being preferably of 50/50.

6. Panel according to claim 1, wherein the melamine resin foam forming the main layer is a formaldehyde, melamine and sodium bisulphite copolymer.

7. Panel according to claim 6, wherein the melamine resin foam has a resistivity between 9,752 and 11,196 N·s/m⁴ and an airflow resistance (AFR) between 990.7 and 1,137.3 N·s/m³.

8. Panel according to claim 1, wherein the adhesive film has a thickness between 0.16 and 0.20 mm.

9. Panel according to claim 8, wherein the adhesive film has a melting temperature between 180° C. and 190° C.

10. Panel according to claim 1, wherein:
    the main layer is a body made of melamine resin foam having a surface density between 600 g/m² and 680 g/m² preferably equal to 650 g/m², and a thickness between 9.5 cm and 11 cm;
    the coating layer is a fabric having a surface density between 110 and 130 g/cm², preferably equal to 120.75 g/cm², and a thickness between 0.3 and 0.4 mm;
    the adhesive film has a surface density between 40 g/m² and 56 g/m², preferably equal to 52 g/m².

11. Part having a wall whereon a panel is attached such as defined according to claim 1, said part being chosen from a space launcher nose cone, a space launcher inter-stage structure, a fuselage of an aircraft, a building, a motorised vehicle and a train.

* * * * *